(No Model.)
R. N. REED.
SOLAR REFLECTING CAMERA.
No. 447,645. Patented Mar. 3, 1891.
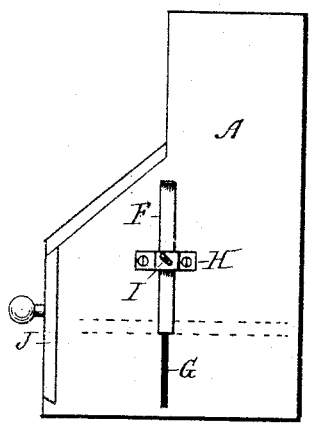
Fig. I.
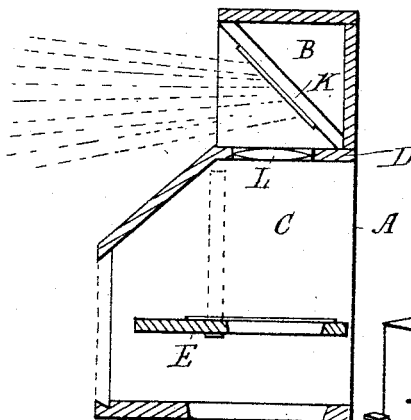
Fig. II.
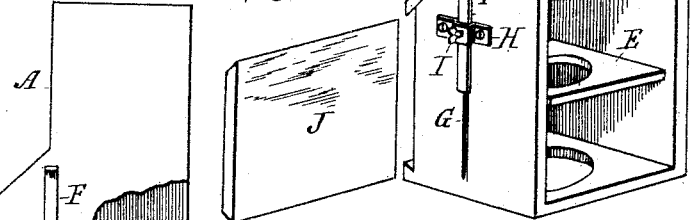
Fig. III.
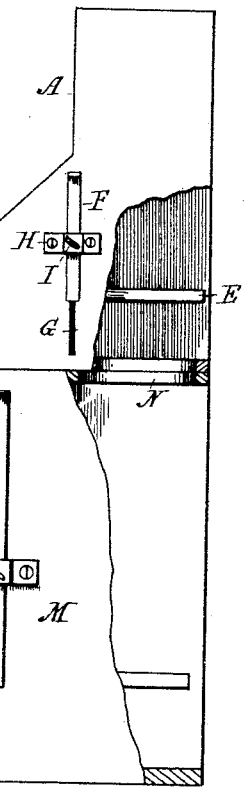
Fig. V.
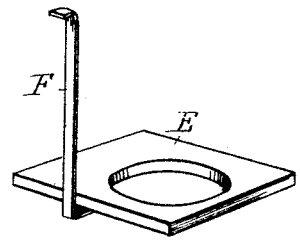
Fig. IV.
WITNESSES:
H. S. Millar
L. M. Adams
INVENTOR:
Robt. N. Reed.
J. H. Bailey
Attorney.
THE NORRIS PETERS CO., PHOTO-LITHO., WASHINGTON, D. C.

UNITED STATES PATENT OFFICE.

ROBERT N. REED, OF COVINGTON, KENTUCKY.

SOLAR REFLECTING-CAMERA.

SPECIFICATION forming part of Letters Patent No. 447,645, dated March 3, 1891.

Application filed April 22, 1890. Serial No. 349,045. (No model.)

*To all whom it may concern:*

Be it known that I, ROBERT N. REED, of Covington, in the county of Kenton and State of Kentucky, have invented a new and useful Improvement in Solar Reflecting-Cameras, which improvement is fully set forth in the following specification and accompanying drawings, in which—

Figure I is a side elevation of my improved solar reflecting-camera; Fig. II, a sectional view of the same; Fig. III, a rear perspective view; Fig. IV, a detail view of the focusing-rack; Fig. V, the camera mounted on a supplementary chamber.

My invention relates to improvements in solar reflecting-cameras; and its object is to provide a simple and inexpensive device whereby paintings, photographs, designs, patterns, and works of art of every description may be enlarged at will and reflected upon canvas, paper, or other suitable surface. All colors and the various shades thereof are transmitted and may be accurately reproduced in the copy. The outlines and minutest details are shown with the utmost distinctness, and may be traced with pencil or crayon, so that perfect fac-similes in form and color may be easily obtained.

The construction and operation of the device will be readily understood by referring to the accompanying drawings, in which A designates a camera having two chambers B and C, one above the other and divided by a horizontal partition D. The lower chamber is open at the rear to receive the light, and is provided with a vertically-movable platform or focusing-rack E. A bent arm F is attached to the rack and extends laterally through the slot G in the side of the camera and thence upwardly through a keeper H, in which it is adjusted by a thumb-screw I. A laterally-sliding shutter J is fitted to the front of this chamber. The upper chamber is closed on all sides except the front and is provided with a forwardly-inclined mirror K so disposed as to receive the light transmitted through the lens L, which is horizontally fixed in the partition D below the mirror, and so as to reflect the light upon the canvas or other surface to which the picture is to be transferred.

For general use the camera is designed to admit photographs of cabinet size or other objects of similar dimensions. If desired, the capacity of the instrument may be easily increased by mounting it upon a larger supplementary chamber M, which is also provided with a suitable focusing-rack. The top of the supplementary chamber has a circular opening N, which registers with similar openings in the bottom and also the focusing-rack of the chamber C.

It will be observed that no skill is required in the arrangement and manipulation of this device. It is only necessary to place it in a window or other suitable opening and exclude the light from the room. The sliding door in front admits the picture to be copied, which is placed on the adjustable shelf or focusing-rack E. When the proper adjustment is made, the sliding door is closed. The light falls upon the picture, radiates through the magnifying-lens L, and the fac-simile of the picture is reflected by the mirror K upon the canvas or paper upon which it is to be drawn or painted. It will be noted that not only are the outlines transferred, but all the gradations of tint and shading of the original.

What I claim as new is—

1. In a solar reflecting-camera having the chambers B and C, divided by the partition D, having in it the lens L, the inclined mirror K in chamber B, and the focusing-rack E, vertically moving in the chamber C, substantially as described.

2. In a solar reflecting-camera having in the upper open front chamber a forwardly-inclined mirror, a horizontal lens below said mirror, and the vertically-movable rack E in the lower chamber, adjustable by set-screw, as described, said lower chamber having in front a laterally-sliding shutter J, all substantially as described.

3. In a solar reflecting-camera, substantially as described, having a lower chamber slotted at G, the vertically-movable platform or focusing-rack E, combined with the bent arm F, extending through said slot and the keeper H, and set-screw I, substantially as and for the purpose set forth.

In testimony that I claim the foregoing I have hereunto set my hand, this 16th day of April, 1890, in the presence of witnesses.

ROBERT N. REED.

Witnesses:
WM. GLEASON,
WM. J. MAAS.